June 28, 1938.　　　　H. NEUBERT　　　　2,121,923
MILLING MACHINE
Filed Feb. 23, 1937　　　　10 Sheets-Sheet 1

Inventor: *Herbert Neubert*
by: *Karl Viertel*
　　　　Attorney

June 28, 1938.   H. NEUBERT   2,121,923
MILLING MACHINE
Filed Feb. 23, 1937   10 Sheets-Sheet 6

Fig. 7

Inventor: Herbert Neubert
by   Karl Viertel
Attorney

Fig. 8

June 28, 1938.    H. NEUBERT    2,121,923
MILLING MACHINE
Filed Feb. 23, 1937    10 Sheets-Sheet 10

Fig. 11

Inventor: Herbert Neubert
by Karl Viertel
Attorney

Patented June 28, 1938

2,121,923

UNITED STATES PATENT OFFICE 2,121,923

MILLING MACHINE

Herbert Neubert, Chemnitz, Germany, assignor to J. E. Reinecker Aktiengesellschaft, Chemnitz, Germany, a corporation of Germany Application February 23, 1937, Serial No. 127,141
In Germany June 29, 1935

2 Claims. (Cl. 90—21)

The invention relates to milling machines and kindred machine tools of the type having a table, which carries the piece of work under treatment and is slidably mounted in a supporting frame, bed or knee, and a mechanism for longitudinally moving said table to and fro relatively to a milling cutter, or other cutting tool,—and more especially to improvements in table feed and control mechanism for machine tools of the type set forth.

The problem underlying this invention, and the various objects aimed at thereby will be more fully understood by first briefly reviewing the state of the art:

It has been conventional practice to provide the work table of milling machines with a rate change and feed control mechanism so designed, that the table is slowly advanced during the milling operation, and is automatically stopped at the end of each full working stroke (see Figs. 8—9) by means of trip dogs, adjustably fixed and throwing out of operation a clutch, disengaging a gear wheel, or dropping a worm or the like,—and wherein the table must be manually restarted for its return stroke, during which the table is rapidly advanced at a higher rate of speed than before into its initial position, where the table is again automatically stopped.

There are also milling machines of a so-called semi-automatic type known for instance from "Machinery's Encyclopedia" 1917 Volume IV page 396, the work table of which can be given by means of trip dogs a variety of cycles of movements:

The simplest of these is the one that would be used for milling a number of surfaces with spaces between. For an operation of this kind, the machine is set to bring the work up to the cutter at a rapid rate; the feed then slows down while the surface is being milled, after which it is accelerated while the cutter is moving across the space to the next piece. The feed is then reduced again for milling, and this operation is repeated until the last surface has been milled.

It is true, that table feeding devices provided with a semi-automatic control and rate change mechanism of the type described greatly reduce the non-cutting or idle periods and thereby increase the production.

However it has been found in the course of the inventor's practical and experimental work, that table feeding devices of said semi-automatic design show a serious drawback in as much as the interval of time,—beginning whenever the table has completed its travel at high speed through an idle period (see 7 in Fig. 1) of its working stroke, and ending when the next following cutting operation sets in—is often all too short, namely does not allow the operator to meanwhile perform at ease and with the necessary care and precautions all the requisite, auxiliary operations, including for instance raising or lowering the table with regard to stepped surfaces (designated 5—6 in Fig. 1), or re-adjusting the table laterally with regard to surfaces in staggered position to each other, and including also the directing of the current of lubricating oil or cooling liquid at the very last moment possible to the place, where the next cut out begins in order not to prematurely hide the cutting operation under the current of liquid, but to enable the operator to visually control the depth of the cut at its very start.

The principal object of this invention is to overcome the said drawback inherent to milling machines known heretofore by providing the table with a structurally improved feeding device having a rate changer and a switching mechanism, so designed with regard to idle periods of the working stroke at the table, that—

(1) The table—instead of automatically changing its rate of speed,—as known heretofore—namely continuing to travel at a reduced rate at the beginning of a fresh cutting period, is automatically stopped just shortly before the fresh cut sets in;

(2) That by simply shifting one and the same control lever from its position for rapid table feed into the next position the table will resume its travel in the same direction at reduced speed for a fresh cutting period, and (3) That by another turn of the same control lever the table feeding device is reset for rapidly re-turning the table into its initial position.

Other objects and advantages of the invention will become readily apparent hereinafter to practitioners in this field.

The nature and scope of the invention are briefly outlined in the appended claims and will be more fully understood from the following specification taken together with the accompanying drawings, in which:

Figure 1:
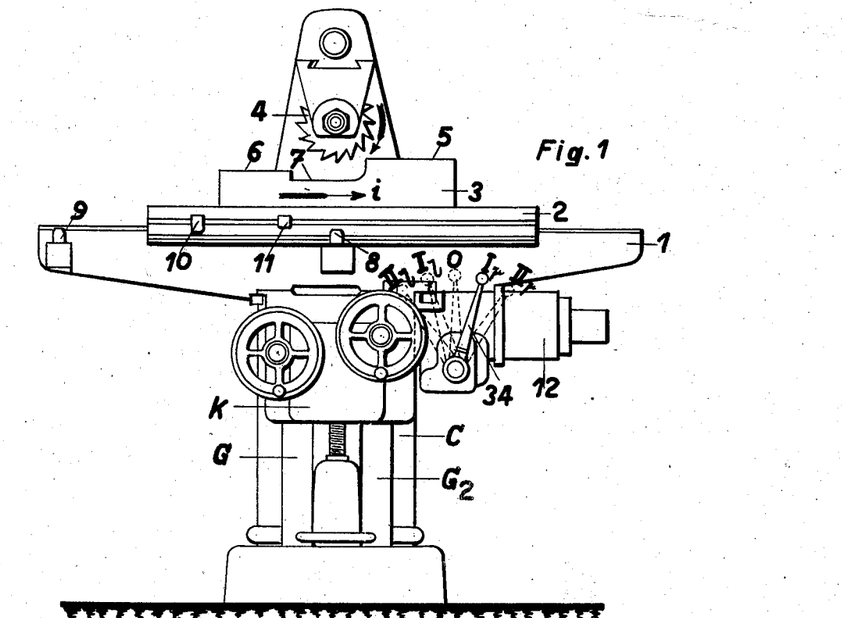
Fig. 1 is a front elevation of a milling machine of the column and knee type, having a table feeding device and control mechanism redesigned according to this invention.
Figure 2:
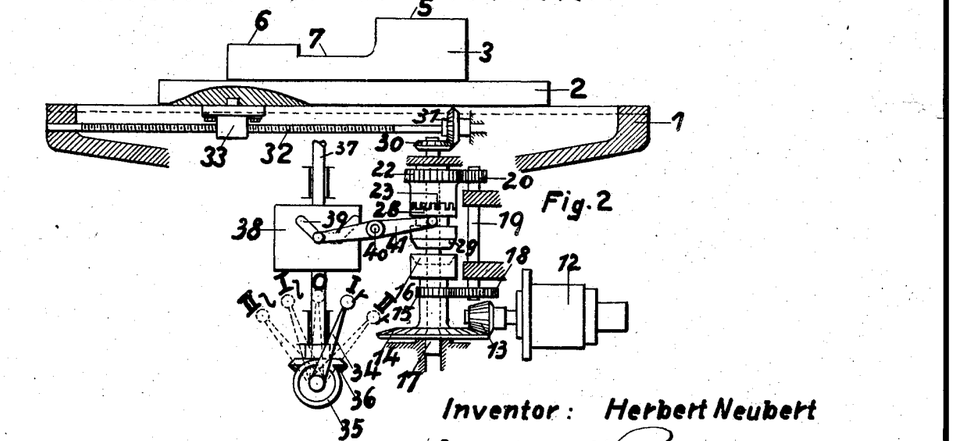
Fig. 2 is a fragmentary front elevation—partly in section—of the work table, of the saddle, in which the table is slidably mounted, and of the table feeding device, the latter being shown in an enlarged scale.
Figure 3:
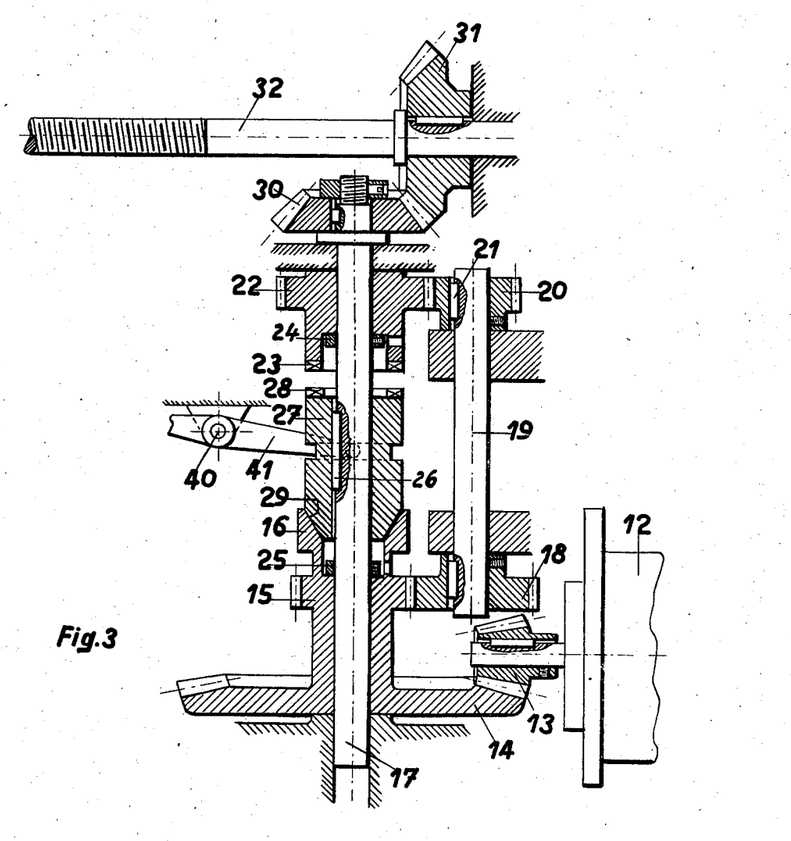
Fig. 3 is a sectional view of the rate changer of the table feeding device shown in a still larger scale.
Figure 10:
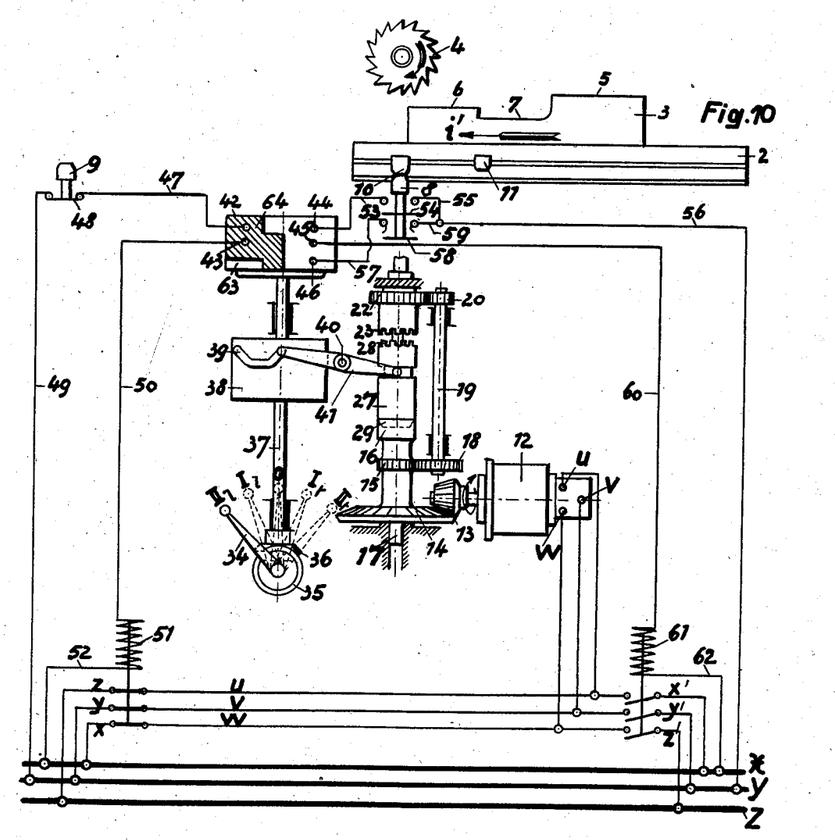

The milling machine shown by way of an example in Fig. 1 is of the conventional column and knee type, comprising a column C formed with vertical guide ways G, G2, on the front face of which a knee K is mounted for vertical adjustment; the knee K supports a saddle 1 on guide ways for movement toward and from the column C; on the saddle 1 the work table 2 is slidably mounted carrying the piece of work 3 and is reciprocated relatively to the revolving cutter 4 by means of the table feeding device re-designed according to this invention and comprising:

(1) An electric three-phase current motor 12, which is connected with the main lines X, Y, Z through branch lines $x$, $y$, $z$, $x'$, $y'$, $z'$, triple pole switches operated by electromagnets 51, 61, and feed lines $u$, $v$, $w$ in such manner, that on closing the circuit at 51, as seen in Fig. 10, the motor 12 will rotate in a certain—say clockwise—direction, indicated by an arrow, while on closing the circuit at 61, the motor will reverse its direction of rotation;

(2) A screw and nut gear 32, 33, journalled in the saddle 1, and engaging the table 2 (Fig. 2);

(3) A rate changer interconnecting the said motor 12 and feed screw 32 (Fig. 3) which comprises:

Two pairs of bevel gear wheels 13—14, 30—31, of which wheel 30 is keyed to a rotary shaft 17, while wheel 14 is journalled thereon and secured in its position by a set-collar 25;

An auxiliary shaft 19, to which are keyed a gear wheel 18 meshing with a crown of teeth 15, attached to the hub of wheel 14, and another gear wheel 20, keyed at 21 to shaft 19 and meshing with a crown of teeth 22, attached to a toothed clutch member 23, which is journalled on shaft 17 and secured in its position by a set-collar 24;

A friction clutch member 16 presenting an internal conical working face being attached to the hub of the wheel 14;

A composite clutch 27 splined at 26 on main shaft 17 so as to slide thereon and presenting at one end a crown of teeth 28 and at the other end a conical working face 29 for engagement respectively with the corresponding conical face of the friction clutch member 16, and with the opposed teeth 23 of the clutch member 22.

Figure 4:
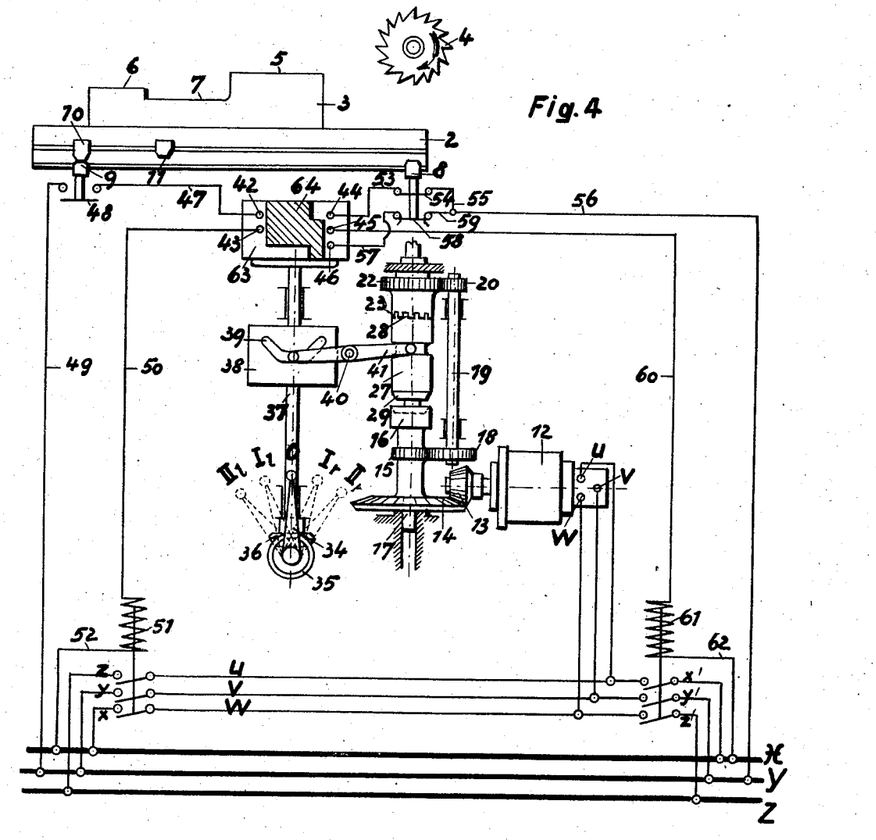
Figs. 4–11 are schematic lay-outs showing the work table in different characteristic positions, and the corresponding positions of the rate changer, its control mechanism, and of the electric switching attachment cooperatively connected therewith.
Figure 5:
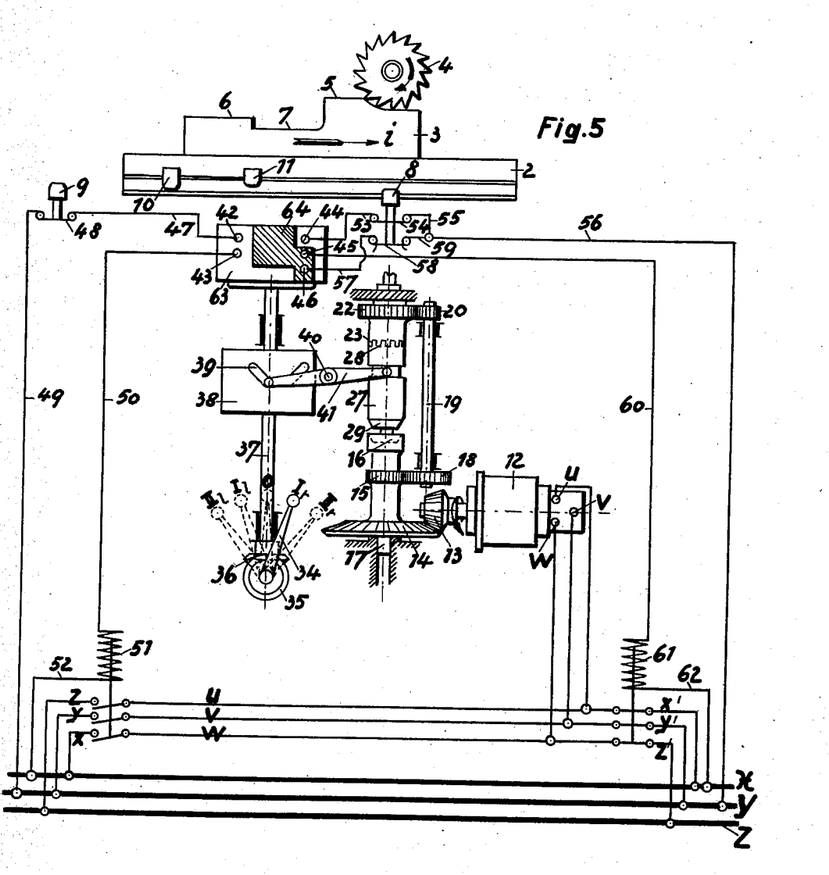
Figure 6:
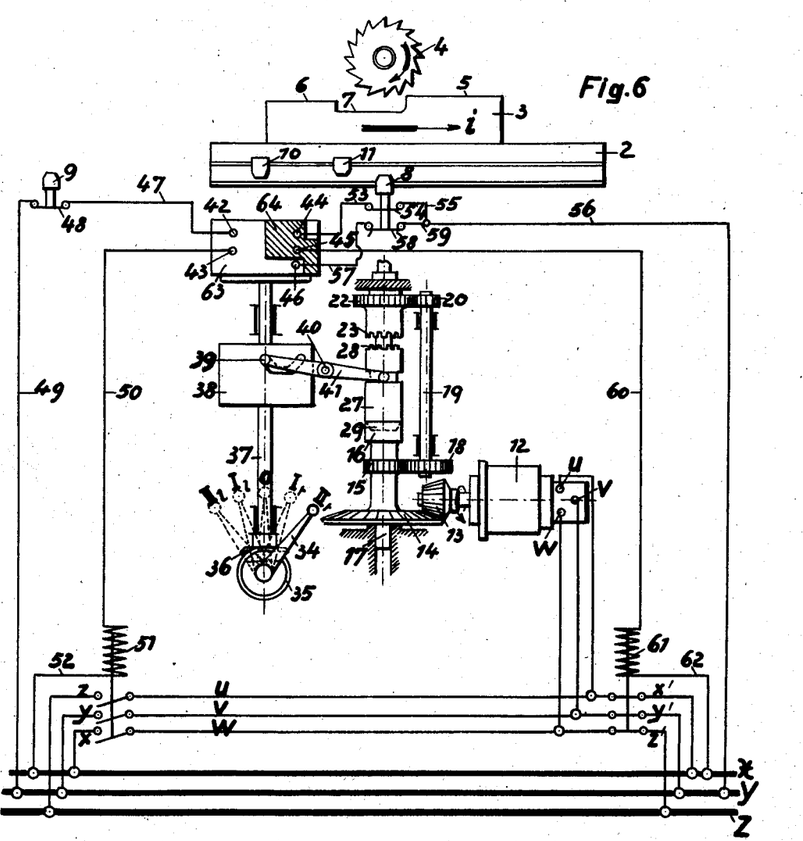
Figure 7:
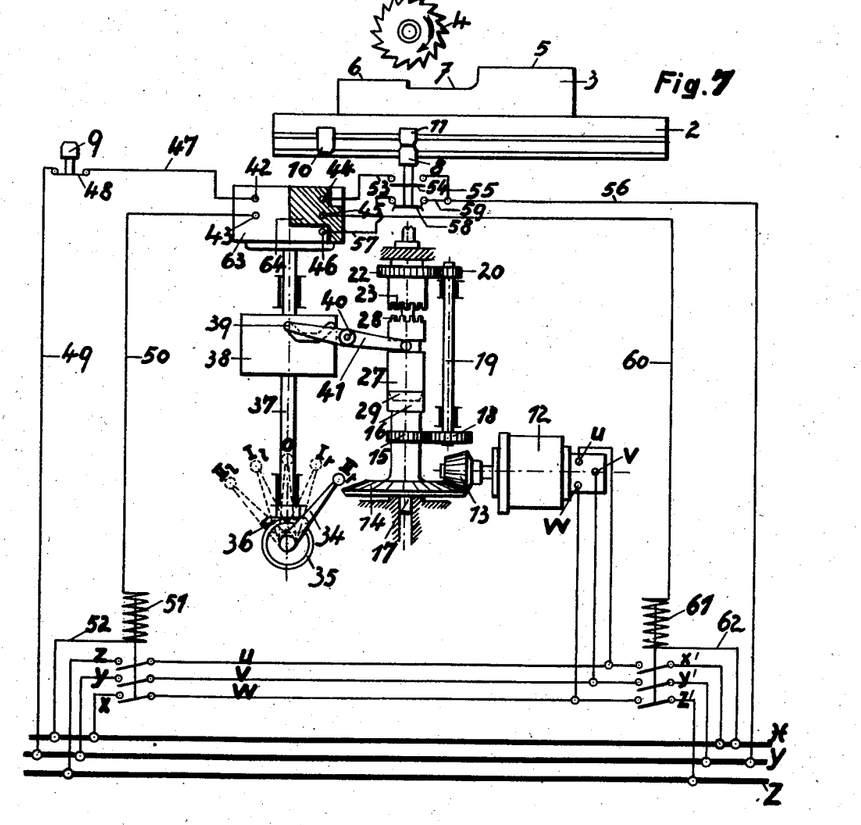
Figure 8:
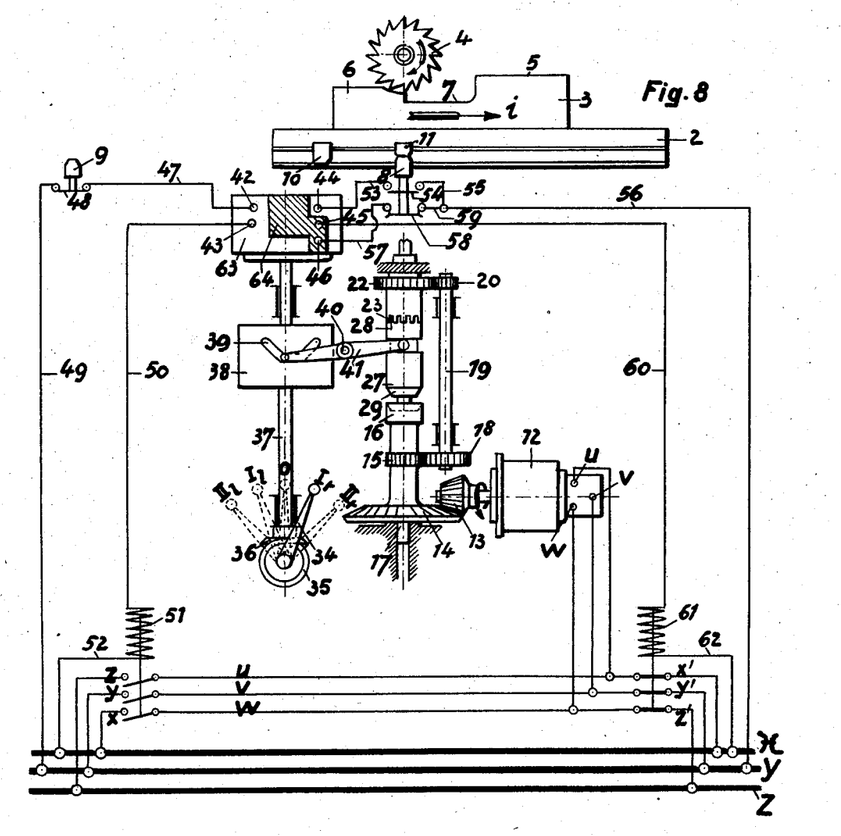
Figure 11:
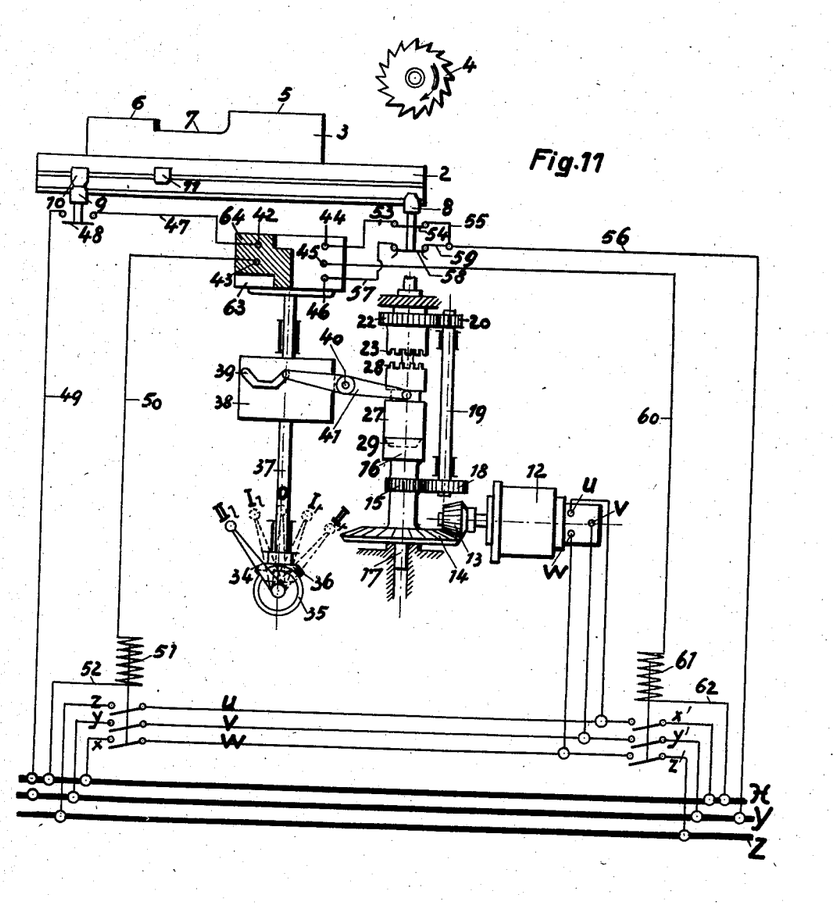

The resultant ratio of gearing of the gear wheels 15, 18 and 20, 22 is so chosen, that the toothed clutch 23 rotates at a lower rate of speed than the friction clutch 16;

(4) Speed controlling means, which comprise:

A double armed shift lever, fulcrumed at 40, (Fig. 2) the forked arm 41 of which engages the composite clutch 27, while the other arm fitted with a pin engages a grooved cam 38, 39 keyed to a rotary shaft 37 and being operable by a pair of bevel gear wheels 35, 36 and a hand lever 34; the groove 39 of cam 38 so shaped, that, whenever lever 34 is in any of its outermost positions, indicated at IIl (left) and IIr (right), friction clutch 16, 29 will be in engagement and rotate the main shaft 17 at high rate of speed (Figs. 6, 10), while, whenever the lever 34 is in its zero position, indicated at 0 (Fig. 5), or in the intermediate position I$r$ (Fig. 9) shaft 17 and consequently screw 32 of the table feeding device will rotate at reduced speed;

(5) An electric switching mechanism, which according to this invention is directly associated with the rate changer for cooperation therewith, namely preferably keyed to cam shaft 37, and which comprises:

A rotary switch 63 having a stepped contact bridge 64, which is shown in Fig. 4 in its zero position, and which is designed to selectively interconnect in its various working positions described hereinafter two of the contact brushes, adjacently disposed to each other for cooperation with the contact bridge 64, namely either brushes 42 and 43, as seen in Figs. 10 and 11, or brushes 45 and 46, as seen in Figs. 5 and 8, or brushes 44 and 45, as seen in Figs. 6 and 7; and:

A system of spring loaded circuit breakers 48, 54, 58, designed for cooperation with the work table 2 through a plurality of trip dogs 10, 11 of different depth, which are adjustably fixed thereon, and so proportioned, that the broader trip dog 10 on engaging and depressing its mate 9 (Fig. 4) will break an auxiliary circuit 47—48—49—52—51—50 at 48, thereby in turn breaking the main circuit at $z$, $y$, $x$,—and by depressing its other mate 8 (Fig. 9) will break two auxiliary circuits simultaneously, namely circuit 53—54—55—56—62—61—60 at 54, and circuit 60—57—58—59—56—62—61 at 58, thereby in turn breaking the main circuit at $x'$, $y'$, $z'$,—while the shorter trip dog 11 on depressing the mate dog 8 (Figs. 7, 8) will break alone at 54 the respective auxiliary circuit indicated.

The operation of the table feed motion shown and described above is as follows:

Supposing the work table 2, carrying a piece of work 3, of which two surfaces 5, 6—being in stepped and spaced relation to each other by a recess 7—are to be worked upon by the rotary milling cutter 4, is at rest, namely having been stopped at the end of its return stroke shown in Fig. 11 by the engagement of the dogs 9—10; (see also Fig. 4):

In order to start the table 2 for a fresh working stroke in the direction of arrow $i$, after requisite readjustments, such as raising, cross feeding the table, etc., have been made, the control lever 34 is shifted into the right hand position I$r$ (Fig. 5); thereby the clutch 27 is thrown into engagement with the toothed clutch member 23, and the rotary switch 63, 64 is angularly shifted into a position, in which the auxiliary circuit 62—61—60—45—46—57—58—59—56 energizing the electromagnet 61 is closed at 45—46, whereby in turn the main circuit is closed at $x'$, $y'$, $z'$, causing the motor 12 to rotate in anticlockwise direction, and to move tl table 2 ahead at low speed for cooperation with the cutter 4 (Fig. 5).

It should be noted, that at any moment during and after the respective cutting operation by a short turn of the control lever 34 from I$r$ to 0 (as seen in Fig. 4) the auxiliary circuit concerned may be broken at 45—46, and in turn the main circuit at $x'$, $y'$, $z'$, whereby the table 2 ceases at once to move.

Fig. 6 shows the respective positions of the lever 34, cam 39 and switch 63, in which the feeding device is re-set for rapidly moving the table 2 ahead during a period of idly running due to a recessed portion 7 not under the treatment:

The conical end 29 of clutch 27 being then in frictional engagement with the rapidly driven clutch member 16, and the primary auxiliary circuit 62—61—60—53—54—55—56 being closed by the contact bridge 64 at 44—45 until being automatically broken at 54 by the engagement of the shorter dog 11 and its mate 8, whereby the supply of current to the motor 12 and in turn the motion of table 2 is automatically stopped, as shown in Fig. 7.

Since the table 2 is at rest at the end of a period of idly running and must be manually restarted for a new cutting period (Fig. 8), the operator will always have ample time at his disposal and be perfectly free for making at ease the necessary re-adjustments and supplying afresh the cooling liquid, and at the very latest moment, even if the idle period, when the table was fed at high rate, had been very short.

Fig. 8 shows, how the aforesaid primary auxiliary circuit, energizing the electromagnet 61 and making the main circuit at $x'$, $y'$, $z'$ is closed at 45—46 by a short turn of lever 34 to the left into the position Ir, and how the clutch 27 is concurrently thrown into re-engagement with the toothed clutch member 23 with the result, that the feed motion starts feeding the table 2 at reduced speed in the direction of arrow $i$ so as to subject the next following face 6 of the piece of work 3 to the milling operation by the cutter 4.

Figure 9:
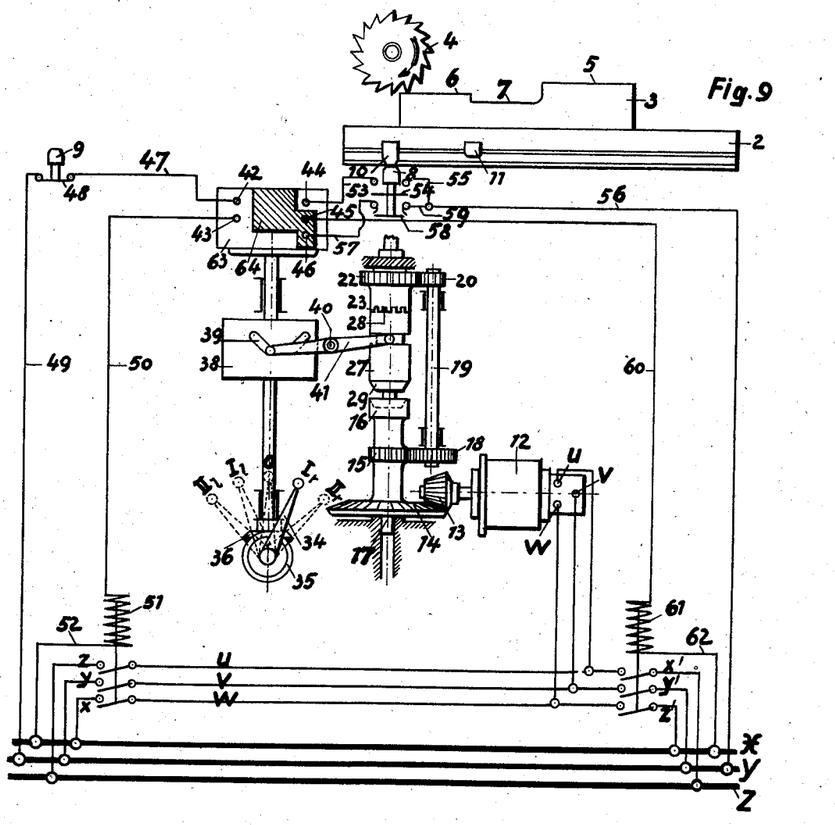

At the end of said milling operation the table 2 is automatically stopped by the interengagement of the broader dog 8 and its mate 10, whereby the aforesaid primary auxiliary circuit is broken at 54 and 58, as seen in Fig. 9.

Fig. 10 shows, how by shifting the control lever 34 to the left into the extreme position at the left designated III, the conical end portion 29 of the clutch 27 is thrown into frictional re-engagement with the rapidly revolving clutch member 16, and how the switch 63 is concurrently turned into another active position, in which its contact bridge 64 will close at 42—43 a secondary auxiliary circuit 47—48—49—52—51—50 energizing the electromagnet 51 and in turn making the power circuit at $z$, $y$, $x$.

Thereupon the table 2 will resume its travel in the direction of arrow $i'$ and on completing its return stroke will be automatically stopped by the interengagement of the dogs 9 and 10: The secondary auxiliary circuit referred to above then being broken at 48, and the supply of electric current to the motor 12 cut off at $z$—$y$—$x$, as seen in Fig. 11.

Various modifications and changes may be conveniently made in the structural details and in the assemblage and cooperation of the various component parts of the improved table feeding device for milling machines and kindred machine tools, shown and described, without departing from the spirit and the salient ideas of this invention:

Instead of the mechanically operated clutch 23, 28 shown another type of positively acting clutches,—for instance an electromagnetically operated clutch—may be used to advantage; likewise instead of the friction clutch 16, 29 having conical engaging surfaces, another convenient type of friction clutches may be provided.

Likewise instead of a rate changing mechanism employing toothed gear wheels a hydraulic variable speed power transmission gear employing cylinders and pistons and a liquid working medium may be used to advantage:

Although an alternating current electric motor 12 of the three-phase reversible type as shown has proved to be a very appropriate prime mover for the purpose concerned, namely where electric power is available, said motor may be conveniently replaced under different conditions by another driving attachment or a power transmitter, for instance of the well known hydrodynamic type, involving the flow and reaction principle and operated by a current of oil under pressure or another liquid working medium positively circulated in a closed circuit of pipe lines. In this latter case the rotary switch 63, 64 operated by lever 34, and the circuit makers and breakers 48, 54, 58 operated by the table 2 would have to be replaced by an analogous switching or distributing device, and a system of valves (not shown), which are cooperatively interconnected with each other, with the table 2 and the driving attachment through trip dogs or the like and through a system of pipe lines instead of electric cables.

Hence it should be conclusively noted, that the invention is not restricted to the use of an electric motor, but that also with driving means of another type the problem underlying this invention may be satisfactorily solved and carried out in practice, namely to control the operation of the table feeding device, including its direction of movement, and of its rate changing mechanism by one single control lever and in such manner, that by simply shifting said control lever into the next following working position, the table after having been automatically stopped at the end of an idle period is re-started in the previous direction for a fresh cutting period and at a reduced rate of speed.

The invention is not restricted to the employment of a single trip dog 11 automatically interrupting the travel of the work table 2 at the end of a period of idly running (7) at high speed: Obviously a plurality of trip dogs 11 or equivalent controlling elements may be fixed at the table for cooperation with the circuit breaker 54 according to the number of recesses and other spaces in the piece of work, which remain out of treatment.

Selfacting brakes and kindred mechanism, known per se and not shown, may be conveniently provided for instantaneously slowing down and stopping the electric motor 12 on being disconnected from the power circuit in the manner shown and described.

What I claim is:

1. In a milling machine a reciprocable work table, a feeding device for reciprocating said table, a reversible electric motor for operating said feeding device, a rate changing mechanism cooperatively interconnecting the latter and the said electric motor for alternately feeding the work table at low speed during cutting periods, and at a higher rate during idle periods of its working stroke, electrically operated means for automatically stopping the table at the end of idle periods of its working stroke, and a single lever control mechanism for re-starting thereafter at the operator's discretion the work table in the previous direction for the next following cutting period and at a reduced rate of speed, said automatic stopping means comprising electromagnetic switches for connecting said reversible electric motor with and disconnecting it from the main power circuit, two auxiliary electric circuits for operating said electromagnetic switches, trip dogs adjustably fixed at the work table, and circuit breakers responsive thereto for making and breaking said auxiliary circuits, said single lever control mechanism comprising a rotary cam shaft cooperatively associated with said rate changing mechanism, and a rotary electric switch for controlling said auxiliary circuits.

2. In a milling machine a reciprocable work table, a feeding device for reciprocating said table, a reversible electric motor for operating said feeding device, a rate changing mechanism cooperatively interconnecting the latter and the said electric motor for alternately feeding the work table at low speed during cutting periods, and at a higher rate during idle periods of its working stroke, electrically operated means for automatically stopping the table at the end of idle periods of its working stroke, and a single lever control mechanism for re-starting thereafter at the operator's discretion the work table in the previous direction for the next following cutting period and at a reduced rate of speed, said automatic stopping means comprising electromagnetic switches for connecting said reversible electric motor with and disconnecting it from the main power circuit, two auxiliary electric circuits for operating said electromagnetic switches, trip dogs adjustably fixed at the work table, and circuit breakers responsive thereto for making and breaking said auxiliary circuits, said single lever control mechanism comprising a rotary cam shaft cooperatively associated with said rate changing mechanism, and a rotary electric switch for controlling said auxiliary circuits, said rotary switch being keyed to said cam shaft and comprising a stepped contact bridge and two sets of contact brushes, cooperatively associated therewith.

HERBERT NEUBERT.